(12) United States Patent
Cutler

(10) Patent No.: US 8,614,734 B2
(45) Date of Patent: Dec. 24, 2013

(54) TECHNIQUES FOR DETECTING A DISPLAY DEVICE

(71) Applicant: Microsoft Corporation, Redmond, WA (US)

(72) Inventor: Ross G. Cutler, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/644,866

(22) Filed: Oct. 4, 2012

(65) Prior Publication Data

US 2013/0027506 A1  Jan. 31, 2013

Related U.S. Application Data

(63) Continuation of application No. 11/824,412, filed on Jun. 29, 2007, now Pat. No. 8,300,080.

(51) Int. Cl.
*H04N 7/14* (2006.01)

(52) U.S. Cl.
CPC ..................... *H04N 7/14* (2013.01)
USPC .................... 348/14.08; 348/14.1; 348/14.12

(58) Field of Classification Search
USPC ............................... 348/14.01–14.16
See application file for complete search history.

(56) References Cited

U.S. PATENT DOCUMENTS

| | | | |
|---|---|---|---|
| 3,118,340 A | 1/1964 | Iwerks et al. | |
| 5,818,514 A | 10/1998 | Duttweiler et al. | |
| 5,959,662 A | 9/1999 | Chaffer et al. | |
| 6,353,662 B1 | 3/2002 | Foladare et al. | |
| 6,483,532 B1 | 11/2002 | Girod | |
| 6,611,281 B2 | 8/2003 | Strubbe | |
| 6,628,767 B1 | 9/2003 | Wellner et al. | |
| 6,795,106 B1 | 9/2004 | Cooper | |
| 7,020,337 B2 | 3/2006 | Viola et al. | |
| 7,031,499 B2 | 4/2006 | Viola et al. | |
| 7,081,915 B1 | 7/2006 | Hamilton | |
| 7,092,001 B2 | 8/2006 | Schulz | |
| 7,099,510 B2 | 8/2006 | Jones et al. | |
| 7,119,829 B2 | 10/2006 | Leonard et al. | |

(Continued)

FOREIGN PATENT DOCUMENTS

JP           1996125835 A    5/1996
KR   10-2000-0044065 A    7/2000

(Continued)

OTHER PUBLICATIONS

"EF400", http://www.aspi.com/products/echofree/ef400.html.

(Continued)

*Primary Examiner* — Melur Ramakrishnaiah

(57) ABSTRACT

Techniques to detect a display device are described. An apparatus may include a video camera operative to receive video information for an image, and a microphone operative to receive audio information for an image. The apparatus may further include a monitor detection module communicatively coupled to the video camera and the microphone, where the monitor detection module is operative to detect a temporal watermark signal displayed by the monitor within the image, and determine a location for the monitor within the image based on the detection. The apparatus may also include an active speaker detector module communicatively coupled to the monitor detection module, where the active speaker detector module is operative to exclude false positives caused by the monitor. Other embodiments are described and claimed.

15 Claims, 6 Drawing Sheets

(56) References Cited

U.S. PATENT DOCUMENTS

| | | |
|---|---|---|
| 7,197,186 B2 | 3/2007 | Jones et al. |
| 7,212,651 B2 | 5/2007 | Viola et al. |
| 8,024,189 B2 | 9/2011 | Zhang et al. |
| 2003/0037109 A1 | 2/2003 | Newman et al. |
| 2003/0123659 A1* | 7/2003 | Forstrom et al. ............. 380/205 |
| 2005/0175216 A1* | 8/2005 | Bloom et al. ................. 382/100 |
| 2007/0047442 A1* | 3/2007 | Snyder ........................ 370/235 |
| 2007/0127819 A1 | 6/2007 | Lee et al. |
| 2007/0297682 A1 | 12/2007 | Zhang et al. |
| 2008/0089552 A1* | 4/2008 | Nakamura et al. ........... 382/100 |

FOREIGN PATENT DOCUMENTS

| | | | |
|---|---|---|---|
| KR | 10-2000-0044079 A | 7/2000 | |
| WO | 9607979 A1 | 3/1996 | |
| WO | 0137552 A1 | 5/2001 | |

OTHER PUBLICATIONS

Busso, et al., "Smart Room: Participant and Speaker Localization and Identification", pp. 1-4.

Tapia, et al., "Concept and Partial Prototype Video: Ubiquitous Video Communication with the Perception of Eye Contact", pp. 1-2.

International Search Report for PCT Application No. PCT/US2008/065579 mailed Jan. 6, 2009, 2 pages.

"European Search Report", Mailed Date: Feb. 14, 2011, Application No. EP/08769995, Filed Date: Feb. 10, 2011, pp. 5.

\* cited by examiner

TECHNIQUES FOR DETECTING A DISPLAY DEVICE

CROSS-REFERENCE OF RELATED APPLICATIONS

This application claims the benefit of, and priority to, previously filed U.S. patent application Ser. No. 11/824,412 entitled "Techniques For Detecting A Display Device" filed on Jun. 29, 2007, the subject matter of which is hereby incorporated by reference in its entirety.

BACKGROUND

A conference call typically includes video equipment to capture an image of various participants in a room, and audio equipment to record speech for the participants. During the conference call, it may be desirable to focus a video camera on a given participant. For example, active speaker detection (ASD) techniques may be used to focus the video camera on an active speaker. This may be accomplished by identifying a source for human speech within the image, and automatically moving or focusing the video camera on the identified source. In some cases, however, there are additional objects within the room which may potentially interfere with ASD operations. This may result in reduced accuracy in the identification of a given speaker, and the subsequent focus of the video camera. Consequently, there may be a substantial need for improvements in ASD techniques to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to video conference systems. Some embodiments may be particularly directed to various monitor detection techniques to improve ASD operations for a video conference system. In one embodiment, for example, a system or apparatus may comprise a video camera operative to receive video information for an image, and a microphone operative to receive audio information for an image. The system may further comprise a monitor detection module communicatively coupled to the video camera and the microphone. The monitor detection module may be operative to detect a temporal watermark signal displayed by a monitor within the image, and determine a location for the monitor within the image based on the detection. The system may also include an active speaker detector (ASD) module communicatively coupled to the monitor detection module. The ASD module may be operative to determine whether a false positive is caused by the monitor. For example, the ASD module may determine whether an actively speaking participant in a conference call is displayed by the monitor. The ASD module may then select an actively speaking participant for a conference call that is not displayed by the monitor. In this manner, accuracy for the ASD module may be improved by increasing the probability that the video camera focuses on a human speaking participant rather than a monitor displaying a human speaking participant or other distracting video. Other embodiments are described and claimed.

DETAILED DESCRIPTION

Figure 1:
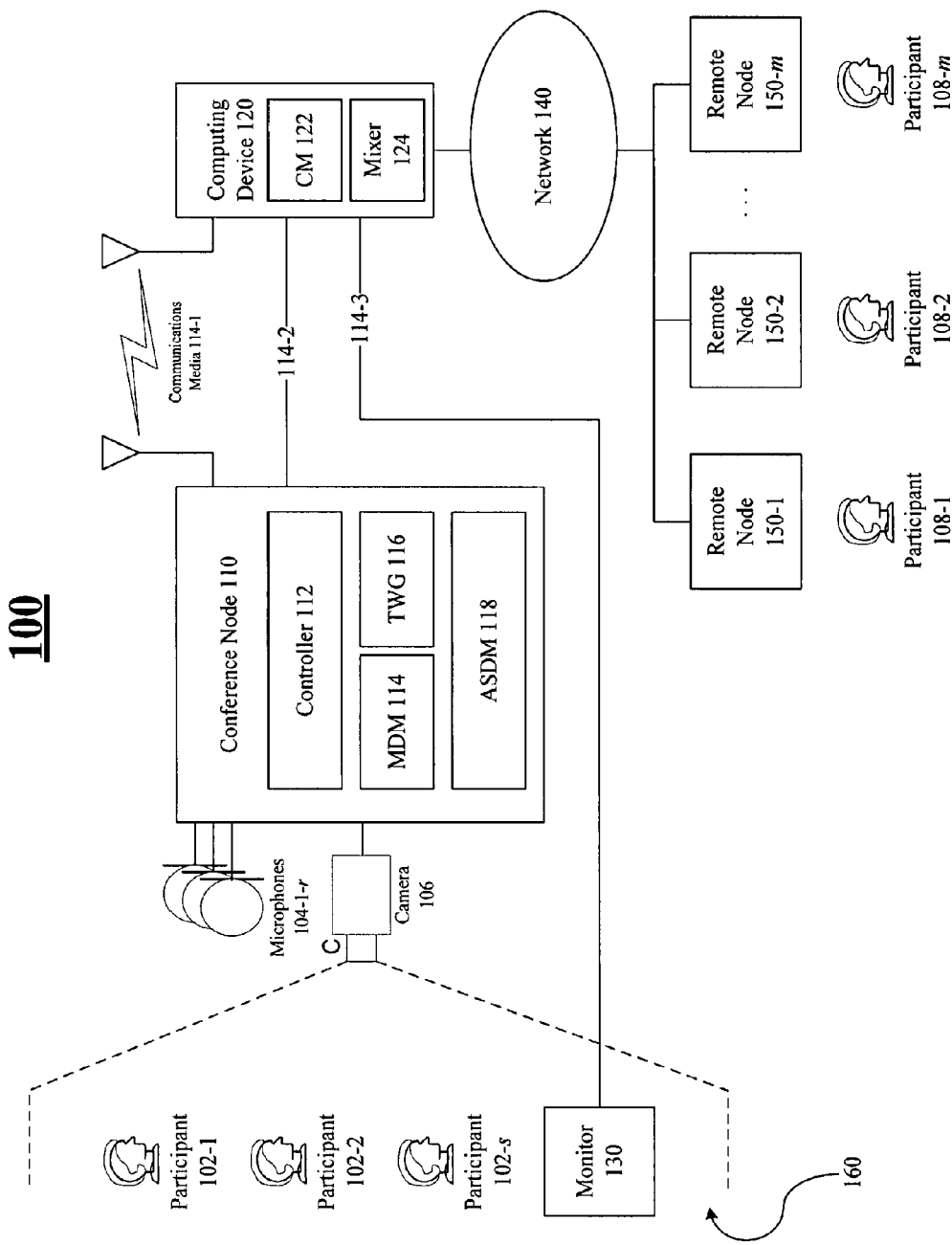
FIG. 1 illustrates one embodiment of a video conference system.

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" or similar language are not necessarily referring to the same embodiment.

Various embodiments may be generally directed to techniques for detecting a display device such as a monitor. Some embodiments may be particularly directed to detecting a monitor within a conference room embedded within a video signal or image captured by a video camera for a video conference call. For example, some embodiments may implement a monitor detection technique in order to identify and locate the presence of a monitor in a conference room during a conference call. Some embodiments may also implement an ASD technique to detect speakers in the conference room using audio (sound source localization) and video (motion and spatial patterns) features. In some cases, however, a false positive can occur in which the ASD selects the monitor. A false positive may refer to when the ASD selects some person or object that is not actively speaking or is not the dominant speaker. For example, this may occur whenever the monitor displays a local participant speaking, or some other noise emanating from the monitor. Consequently, the monitor detection technique may be used to detect the presence of any monitors within the conference room so that the ASD can reduce this type of false positives accordingly.

In one embodiment, for example, a conference node for a video conference system may comprise one or more video cameras operative to receive video information representing an image of a conference room, and one or more microphones operative to receive audio information emanating from the conference room. The system may further comprise a monitor detection module communicatively coupled to the video cameras and the microphones. The monitor detection module may be operative to detect a temporal watermark signal displayed by a monitor within the conference room image, determine a location for the monitor within the image based on the detection, and output a monitor detection signal indicating the presence and location of the monitor. The system may also include an ASD module communicatively coupled to the monitor detection module. The ASD module may be operative to receive the monitor detection signal, and use the monitor detection signal to determine whether a dominant speaker in a conference call is displayed by the monitor, or whether a dominant speaker is within a given proximity of the monitor. The ASD module may then select a dominant speaker for a conference call that is not displayed by the monitor. In this manner, accuracy for the ASD module may be improved by increasing the probability that the video camera focuses on a human speaking participant rather than a monitor displaying a human speaking participant, thereby increasing video conference services and user satisfaction in general.

FIG. 1 illustrates a block diagram of a video conference system 100. The video conference system 100 may be arranged to provide video conference services. A video conference is a set of interactive telecommunication technologies which allow two or more locations to interact via two-way video and audio transmissions simultaneously. Video conferences use telecommunications of audio and video to bring people at different sites together for a meeting. This can be as simple as a conversation between two people in private offices (point-to-point) or involve several sites (multi-point) with more than one person in large rooms at different sites. Besides the audio and visual transmission of people, video conferencing can be used to share documents, computer-displayed information, and whiteboards.

In the illustrated embodiment shown in FIG. 1, the video conference system 100 may comprise a conference node 110. The conference node 110 may comprise a mobile or fixed electronic device having video conference equipment. For example, the conference node 110 may comprise a controller 112, a monitor detection module 114, a temporal watermark generator 116, and an active speaker detector module 118. The conference node may further comprise a microphone array 104 comprising one or more microphones 104-1-$r$, and one or more video cameras 106-1-$p$, where r and p are positive integers and not necessarily equal. In general operation, the conference node 110 may operate to provide general video conference services, such as capturing or recording audio information and video information from a group of video conference participants 102-1-$s$ in a conference room 160, and communicating the recorded signals to other participants remote from the conference room 160 to a set of remote nodes 150-1-$m$ via a computing device 120 and a network 140.

In one embodiment, for example, the conference node 110 may be implemented as a MICROSOFT® ROUNDTABLE compliant device, as made by Microsoft Corporation, Redmond, Wash. The MICROSOFT ROUNDTABLE product is a table-top device, which is approximately the size of a traditional speaker phone at the base. It can be connected to a standard personal computer (PC), such as the computing device 120, to offer synchronized voice and video conferencing. The MICROSOFT ROUNDTABLE device creates a 360-degree, panoramic video of side-by-side images of everyone who is taking part in the conference. It tracks the flow of the conversation, so the image and voice of the person who is speaking are spotlighted. People across many locations can attend meetings together virtually. The MICROSOFT ROUNDTABLE device is designed to interoperate with other video conferencing equipment and communications equipment, including the MICROSOFT OFFICE COMMUNICATIONS SERVER and MICROSOFT OFFICE LIVE MEETING products, implemented via the computing device 120, for example. Although the conference node 110 may be described in terms of the MICROSOFT ROUNDTABLE product, it may be appreciated that the conference node 110 may be implemented with any suitable audio and video equipment having the same or similar features. The embodiments are not limited in this context.

In one embodiment, for example, the microphones 104-1-$r$ may comprise directional or omni-directional microphones capable of receiving audio information generated by the participants 102-1-$s$. Examples of audio information may include human speech, speech segments or utterances made by the participants 102-1-$s$ in the conference room 160. The audio information may be communicated to the remote nodes 150-1-$m$, and/or recorded onto various types of memory elements as described in more detail with reference to FIG. 6. The microphones 104-1-$r$ may also be used for sound beamforming operations to help identify and isolate a dominant speaker in a conference room, as described in more detail with reference to the ASD module 118.

In one embodiment, for example, the video cameras 106-1-$p$ may comprise directional or omni-directional cameras capable of receiving or capturing video information of the participants 102-1-$s$. For example, one or more video cameras 106-1-$p$ may be implemented as a ring camera or "ringcam." A ringcam is a high-resolution omni-directional camera that captures 360-degrees of video. It is typically constructed of separate or discrete digital cameras, each having some desired level of resolution such as 640.times.480 or 800.times.600, for example. Images from each camera are stitched together in real-time to form a high resolution panorama. Digitally stitching together images and then feeding them through a processing device (e.g., controller 112 or computing device 120) enables the capture of images from all around the conference room 160.

In one embodiment, the conference node 110 may include an ASD module 118. The ASD module 118 may be arranged to detect dominant or active speakers in the conference room 160 using audio (sound source localization) and video (motion and spatial patterns) features. The ASD module 118 may determine the dominant speaker in a conference room when several people are talking at the same time. It also compensates for background noises and hard surfaces that reflect sound. For example, the ASD module 118 may receive inputs from six separate microphones 104-1-$r$ to differentiate between different sounds and isolate the dominant one through a process called beamforming. Each of the microphones 104-1-$r$ is built into a different part of the conference node 110. Despite the speed of sound, the microphones 104-1-$r$ may receive voice information from the participants 102-1-$s$ at different time intervals relative to each other. The ASD module 118 may use this time difference to identify a source for the voice information. Once the source for the voice information is identified, the controller 112 may use visual cues from the video camera 106-1-$p$ to pinpoint, enlarge and emphasize the face of the dominant speaker.

In some cases, however, various objects within the conference room 160 may impact the accuracy of the ASD module 118. For example, the conference room 160 may include a display device such as a monitor 130. The monitor 130 may represent any display device capable of reproducing audio and video information, such as a cathode ray tube (CRT) monitor, a liquid crystal display (LCD) monitor, a thin-film transistor (TFT) LCD monitor, a projector screen, a television, a digital television, and so forth. Furthermore, the monitor 130 may display various participants, including participants 102-1-$s$ and/or participants 108-1-$m$. For example, the computing device 120 may include a client module 122 executing a MICROSOFT LIVE MEETING CONSOLE that displays each participant to a video conference call using the monitor 130. Besides the audio and visual transmission of people, the client module 122 can also be used to share documents, computer-displayed information, and whiteboards. Such information may be organized and displayed by the monitor 130 in multiple windows of various configurations and arrangements.

The monitor 130 displays various types of audio and video information that may cause the ASD module 118 to select a false positive. For example, since the monitor 130 displays audio and video reproductions of various participants to a video conference call, when the monitor 130 reproduces audio information and video information for a dominant speaker, the ASD module 118 may falsely identify the monitor 130 as the dominant speaker. This may result in the controller 112 to erroneously focus the video camera 106 on the monitor 130. In fact in some cases, a local participant 102-1-s may be the dominant speaker in the conference room 160 and may also be reproduced via the monitor 130 in the same conference room 160, thereby causing the ASD module 118 to select the monitor 130 in favor of the actual dominant speaker 102-1-s. In these and other scenarios, the presence of the monitor 130 may lead to reduced accuracy and performance in the ASD module 118.

To solve these and other problems, the conference node 110 may include a monitor detection module 114. The monitor detection module 114 may be communicatively coupled to the video camera 106 and the microphone 104. The monitor detection module 114 may be operative to detect a temporal watermark signal displayed by a monitor 130 within an image, video frame or block of video frames taken of the conference room 160 by the video camera 106. The temporal watermark signal may be added to the video signal displayed by the monitor 130 via a temporal watermark generator 116 of the conference node 110 and a mixer 124 of the computing device 120. The monitor detection module 114 may determine a location for the monitor 130 within the conference room 160 based on the monitor detection operations. The monitor detection module 114 may output a monitor detection signal to the ASD module 118 that may be used by the ASD module 118 to filter out the monitor 130 from ASD selection operations.

In one embodiment, the conference node 110 may include a temporal watermark generator 116. The temporal watermark generator 116 may be operative to generate a temporal watermark signal for display by the monitor 130. In general, the temporal watermark signal should be substantially undetectable by humans but robustly detectable by an automated system using video analysis techniques. The temporal watermark generator 116 may output the temporal watermark signal to the monitor 130 via the mixer 124 of computing device 120 and connections 114-2, 114-3. Although the illustrated embodiment of FIG. 1 shows the temporal watermark generator 116 as implemented by the conference node 110, it may be appreciated that the temporal watermark generator 116 may be implemented in other elements of the video conference system 100 as desired for a given set of performance or design constraints. For example, the temporal watermark generator 116 may be implemented as part of the computing device 120 and still fall within the intended scope of the embodiments.

In some embodiments, the temporal watermark generator 116 may generate a low-frequency pattern as the temporal watermark signal for display by the monitor 130. For example, the temporal watermark generator 116 may be arranged to generate a periodic function direct current (DC) offset pattern as the temporal watermark signal for display by the monitor 130. Any periodic signal can be used, such as a ramp, sine wave, square wave, and so forth. Although some embodiments describe the temporal watermark signal as a periodic ramp function DC offset pattern, a sine wave or other periodic signals can be used instead of the ramp signal. The types of temporal watermark signals generated by the temporal watermark generator 116 may vary according to a desired implementation as long as the temporal watermark signal is substantially undetectable by humans but detectable by an automated system.

In one embodiment, for example, the temporal watermark generator 116 may output a generated temporal watermark signal to the computing device 120 via connections 114-2, 114-3 in accordance with the following pseudo-code:

```
function oscillate_image( )
im=imread('client.png');
max_offset=5;
for i=1:100
    for j=[0:max_offset,max_offset−1:−1:1];
        im2=im+j;
        imshow(im2,'InitialMagnification','fit');
        title(sprintf('offset=%d',j));
        pause(.2);
    end
end
```

Figure 2:
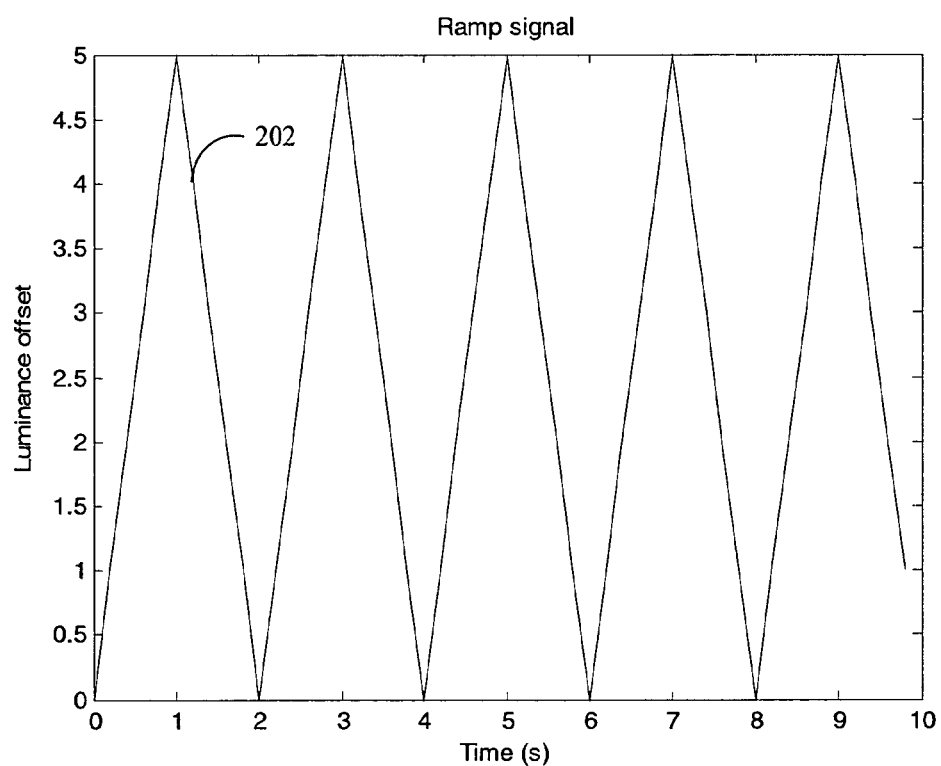
FIG. 2 illustrates one embodiment of a first graph.

FIG. 2 illustrates one embodiment of a graph 200. The graph 200 illustrates a graph having time intervals from 0 to 10 seconds for the X-axis, and luminance offset values from 0 to 5 values for the Y-axis. The graph 200 also illustrates a periodic ramp function DC offset pattern or signal 202 suitable for use as a temporal watermark signal for the monitor 130. The monitor 130 typically displays multiple pixels, with each pixel having a pixel value in some range. For example, given an 8-bit color image, each pixel may have a value from 0-255, with each pixel value representing some range of colors. The periodic ramp function DC offset pattern may be introduced into the video signal by modifying one or more pixel values to increase or decrease in value. For example, assume a video signal and the monitor 130 uses a YUV model to define a color space in terms of one luma and two chrominance components. In the YUV module, the Y component represents the luma component (the brightness), and the U and V components represent the chrominance or color components. In this case, the Y component for one or more pixel values may be increased from 0 to 10 seconds by a luminance offset value from 0 to 5 as shown in the respective X-axis, Y-axis of the graph 500. As the luminance values of the video signal are changed over time in accordance with the periodic ramp function DC offset signal 202, the monitor 130 will slowly increase and decrease the brightness or Y component over time. The rate of increase and decrease of the Y component will be controlled to reduce or prevent human perception, but is robustly detectable by the monitor detection module 114 which analyzes the video image having the monitor 130 with the oscillating signal. During a video conference, the video camera 106 will record an image or series of images with the temporal watermark signal, and output the images to the monitor detection module 114. The monitor detection module 114 may then analyze the images in pixel blocks in order to determine the presence of the temporal watermark signal, and thereby the location of the monitor 130.

Figure 3:
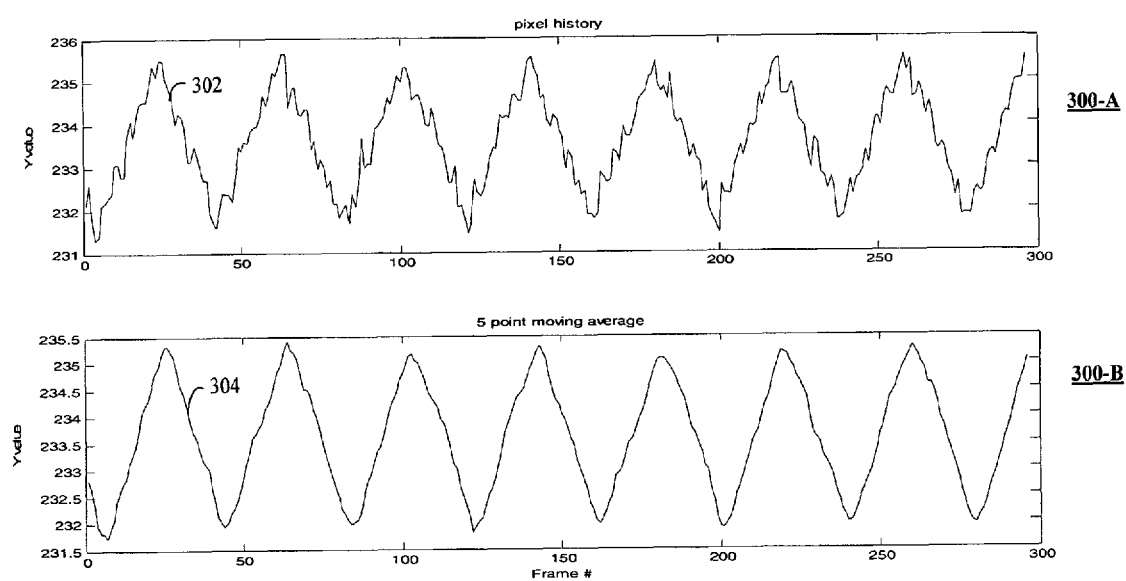
FIG. 3 illustrates one embodiment of a second graph.

FIG. 3 illustrates one embodiment of graphs 300-A, 300-B. The graphs 300-A, 300-B each illustrate a graph having a frame history from 0 to 300 frames for the X-axis, and luminance values (Y) from 231 to 236 for the Y-axis. The graphs 300-A, 300-B also illustrate respective pixel history envelopes 302, 304 for the monitor 130 displaying an image with the embedded signal 202 as described with reference to FIG. 2. The pixel history envelopes 302, 304 may be plotted using various techniques, including the following pseudo-code designed to plot the pixel history of a selected point in a given AVI file:

```
function pixel_slice(avi_file)
fileinfo=aviinfo(avi_file);
%n=fileinfo.NumFrames;
n=300;
mov=aviread(avi_file,1);
imshow(mov.cdata);
[x,y]=ginput(1);
x=round(x);
y=round(y);
for i=1:n
    mov=aviread(avi_file,i);
    Y=rgb2gray(mov.cdata);
    d=5;
    s(i)=mean(mean(Y(y-d:y+d,x-d:x+d)));
    fprintf('frame %d\n',i);
end
a=1;
m=5;
b=ones(1,m)/m;
s2=filter(b,a,s);
subplot(2,1,1);
plot(s(m:n));
title('pixel history');
ylabel('Y value');
subplot(2,1,2);
plot(s2(m:n));
title('5 point moving average');
xlabel('Frame #');
ylabel('Y value');
figure;
max_lag=60;
s3=s2(m:n)-mean(s2(m:n));
plot(-max_lag:max_lag,xcorr(s3,max_lag,'coeff'));
title('xcorr');
xlabel('Lag');
ylabel('Correlation');
```

As shown in FIG. 3, for a given pixel block (e.g., 11.times.11), the pixel history envelope 302 slowly oscillates between 231 to 236 in a number of periodic cycles, with each periodic cycle repeating approximately every 50 frames. In some cases, the pixel history envelope 302 may be smoothed using, for example, a five (5) point moving average to create a smoothed pixel history envelope 304. The smoothed pixel history envelope 304 may be used to facilitate detection of the temporal watermark signal.

Figure 4:
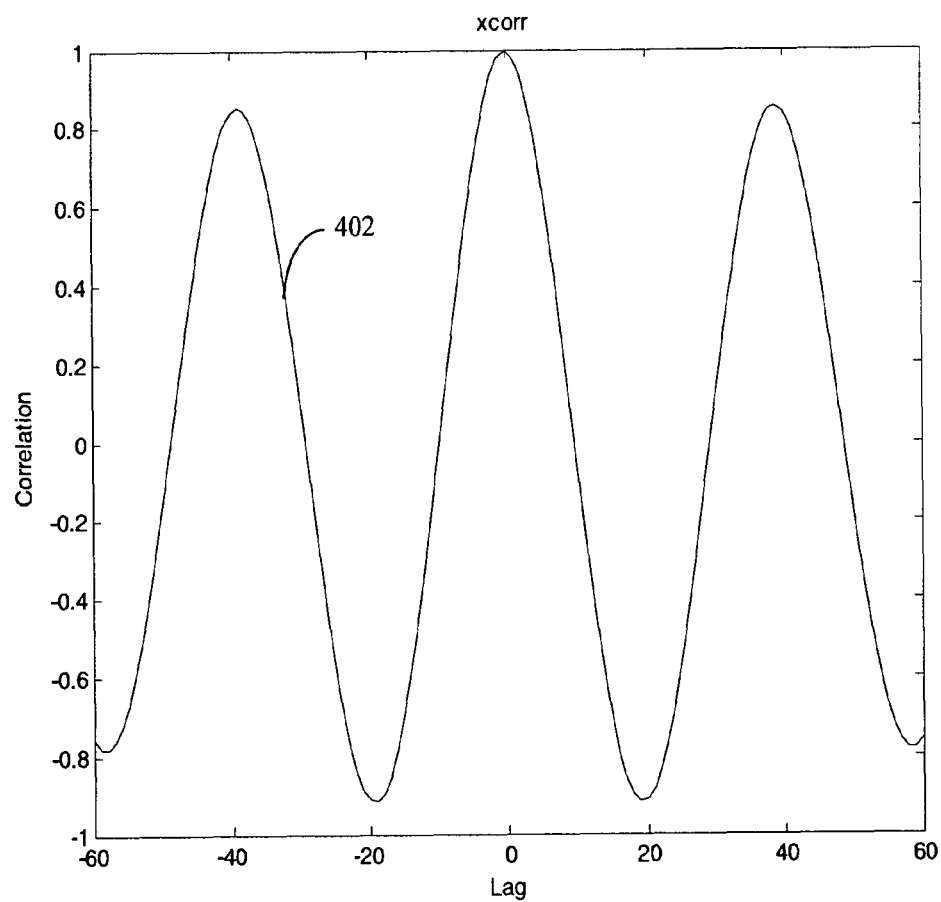
FIG. 4 illustrates one embodiment of a third graph.

FIG. 4 illustrates one embodiment of a graph 400. The graph 400 illustrates an example of a correlation for the smoothed pixel history envelope 304. In various embodiments, the monitor detection module 114 may be arranged to receive the smoothed pixel history envelope 304, and analyze the received signal using cross-correlation techniques in order to detect the presence of the 0.5 Hertz (Hz) signal 202 in the captured images of the video camera 106. Typically only a few periods are needed to accurately perform the detection operations. FIG. 4 illustrates a correlation signal 402 representing the results of the cross-correlation analysis performed by the monitor detection module 114. As an alternative to cross-correlation, a matched filtering technique may be used to detect the embedded temporal watermark signal as well. The number and types of watermark detection techniques suitable for use with a given implementation may vary considerably as long as the particular temporal watermark signal is tuned to the monitor detection technique. The embodiments are not limited in this context.

It is worthy to note that saturated (e.g., white) or undersaturated (e.g., black) pixel blocks may be difficult to detect, but improved morphology and/or image processing techniques can be used to fill-in these particular areas. In addition, the monitor detection technique could be temporally filtered over many seconds (e.g., 60 seconds) in order to improve accuracy. Furthermore, the monitor detection module 114 should be enabled to perform monitor detection only when the automatic exposure control (AEC) and/or automatic gain control (AGC) is converged to exclude false negatives in the temporal filtering. Device movement does not necessarily need special handling as long as the temporal filtering duration is of a relatively limited duration.

In one embodiment, the conference node 110 may include an ASD module 118. The ASD module 118 may be communicatively coupled to the monitor detection module 118. The ASD module 118 may be operative to determine whether a dominant or actively speaking participant from among the participants 102-1-$s$ or the participants 108-1-$m$ in the video conference call is displayed by the monitor 130. The ASD module 118 may receive a monitor detection signal from the monitor detection module 114. The monitor detection signal may indicate the presence of the monitor 130 within the conference room 160. Furthermore, the monitor detection signal may indicate an approximate location for the monitor 130. Given the location of the monitor 130, the ASD module 118 can use the pixel blocks at the location of the monitor 130 to reduce false positives. The ASD module 118 can use the monitor detection results as input into a training algorithm, or a set of hard-coded rules. An example of a hard-coded rule may be that detected speakers must have less than some predetermined threshold value of monitor pixels, such as less than approximately 25% monitor pixels. It may be undesirable, although feasible, to remove the entire monitor region from the ASD module 118 selection algorithm since a dominant speaker can potentially be standing in front of the monitor 130. To avoid the need to remove the entire monitor region, the monitor detection module 114 and/or the ASD module 118 can be arranged to perform block-based processing. Block-based processing also reduces computational load. As a result, the ASD module 118 may select an actively speaking participant for a conference call that is not displayed by the monitor 130.

Operations for the video conference system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the video conference system 100 or alternative elements as desired for a given set of design and performance constraints.

Figure 5:
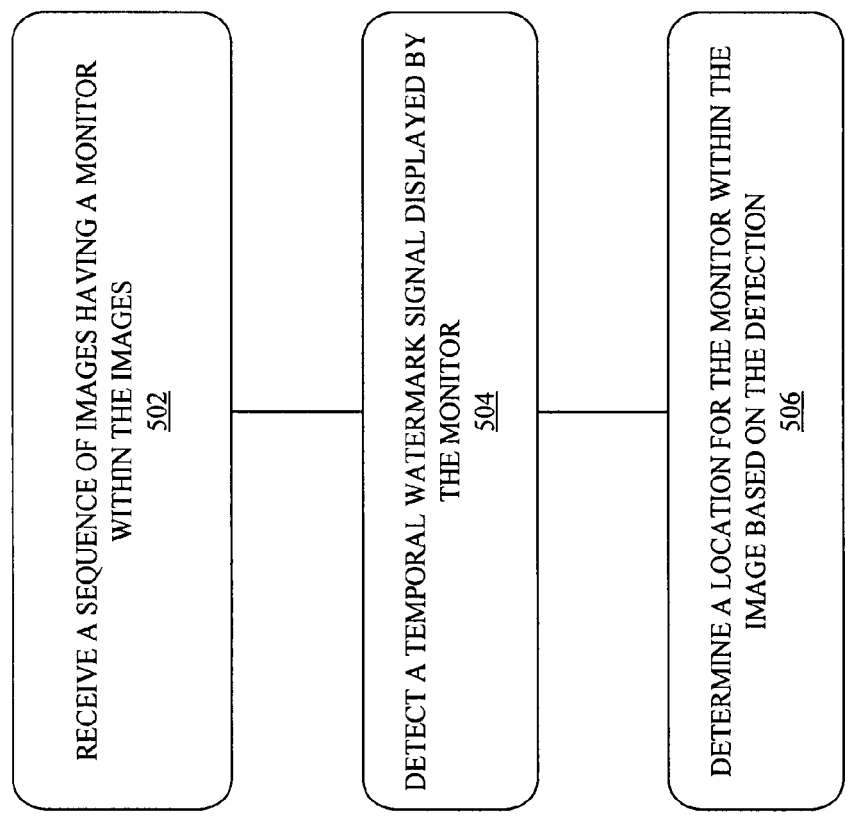
FIG. 5 illustrates one embodiment of a logic flow.

FIG. 5 illustrates a logic flow 500. Logic flow 500 may be representative of the operations executed by one or more embodiments described herein. As shown in logic flow 500, the logic flow 500 may receive a sequence of images having a monitor within the image at block 502. The logic flow 500 may detect a temporal watermark signal displayed by the monitor at block 504. The logic flow 500 may determine a location for the monitor within the image based on the detection at block 206. The embodiments are not limited in this context.

In one embodiment, the logic flow 500 may receive an image having a monitor within the image at block 502. For example, the video camera 106 may capture real-time video images of the participants 102-1-$s$ and the monitor 130 in the conference room 160. The streaming video may be communicated from the conference node 110 to the computing device 120 via a wireless shared media 114-1 or a wired communications media 114-2. The computing device 120 may include a client module 122 implementing video conferencing software to display images of the participants in the video conference call, including the local participants 102-1-*s* and the remote participants 108-1-*m*. The computing device 120 may also communicate the streaming video captured by the video camera 106 to the remote nodes 150-1-*m* via a network 140. The network 140 may comprise any type of suitable network, including a packet-switched network, a circuit-switched network, or a combination of both, with the appropriate interfaces and equipment.

As the participants 102-1-*s* each take a turn speaking at various times, the microphones 104 and ASD module 118 may be used determine a dominant or active speaker from among the participants 102-1-*s* using various sound source localization techniques. Once a dominant speaker has been identified and located, the controller 112 may cause the video camera 106 to automatically focus on the dominant speaker, or the client module 122 may modify its graphic user interface (GUI) to display the dominant speaker in a different manner. An example of the latter case may be enlarging the GUI window displaying the dominant speaker relative to the other GUI windows, moving the GUI window displaying the dominant speaker to a different location on the monitor 130, and so forth.

In one embodiment, the logic flow 500 may detect a temporal watermark signal displayed by the monitor at block 504. In order to reduce or prevent the ASD module 118 from identifying and locating the monitor 130 as the source for an active speaker, the monitor detection module 114 may implement various video analysis techniques to detect a temporal watermark signal injected into the video signal displayed by the monitor 130 via the temporal watermark generator 116. For example, the temporal watermark generator 116 may output a generated temporal watermark signal to the computing device 120 via connections 114-2, 114-3. The computing device 120 may include a mixer 124. The mixer 124 may receive as input the temporal watermark signal and a video signal for the monitor 130. The mixer 124 may be arranged to mix or add the temporal watermark signal to the video signal to embed the temporal watermark signal into the video signal. The mixer 124 may output the mixed signal to a video card of the monitor 130 for subsequent display by the monitor 130.

In one embodiment, for example, the monitor detection module 114 may detect a temporal watermark signal displayed by the monitor 130 in accordance with the following pseudo-code:

```
function detect_monitor(avi_file)
n=300;
width=80;
height=60;
for i=1:n
    mov=aviread(avi_file,i);
    Y=rgb2gray(mov.cdata);
    s(i,:,:)=imresize(Y,[height width],'bilinear');
    fprintf('frame %d\n',i);
end
r=zeros(height,width);
for x=1:width
    for y=1:height
        S=detrend(double(s(:,y,x)));
        a=1;
        m=5;
        b=ones(1,m)/m;
        S2=filter(b,a,S);
        S2=S2(m:length(S2));
        max_lag=60;
        c=xcorr(S2,max_lag,'coeff');
        [max_val,max_i]=local_max(c);
        if length(max_i)~=3
            continue;
        end
        lag=max_i(3)−max_i(2);
        target_lag=39;
        lag_tol=4;
        if max_val(3)>0.5 && lag>=target_lag-lag_tol && lag<=target_lag+lag_tol
            r(y,x)=1;
        end
    end
end
se=strel('square',3);
r=imerode(r,se);
r=imdilate(r,se);
width2=800;
height2=600;
r2=imresize(r,[height2 width2]);
mov=aviread(avi_file,1);
im=mov.cdata;
imwrite(im,'monitor.png');
for x=1:width2
    for y=1:height2
        if r2(y,x)==1
            im(y,x,:)=[255,0,0];
        end
    end
end
imshow(r);
figure;
imshow(im);
imwrite(im,'monitor results.png');
function [max_val,max_i]=local_max(x)
% return the local maximums
max_val=x(1);
max_i=1;
n=length(x);
j=1;
for i=2:n-1
    if x(i)>x(i-1) && x(i)>x(i+1)
        max_i(j)=i;
        max_val(j)=x(i);
        j=j+1;
    end
end
```

In one embodiment, the logic flow 500 may determine a location for the monitor within the image based on the detection at block 506. For example, once the temporal watermark signal displayed by the monitor 130 is detected by the monitor detection module 114, the monitor detection module 114 and/or the ASD module 118 may analyze the video frames to isolate a location for the monitor 130. The modules 114 and/or 118 may perform video analysis on a per block basis in order to determine an approximate region within a video frame or group of video frames where the oscillation occurs. The pixel blocks corresponding to the identified region may then be tagged or identified as monitor pixel blocks. The ASD module 118 may then use the monitor pixel blocks to filter out the monitor 130 from ASD selection operations. For example, the ASD module 118 may use the monitor pixel blocks to determine whether an actively speaking participant in a conference call is displayed by the monitor 130. The ASD module 118 may then select an actively speaking participant for a video conference call that is not displayed by the monitor 130.

Figure 6:
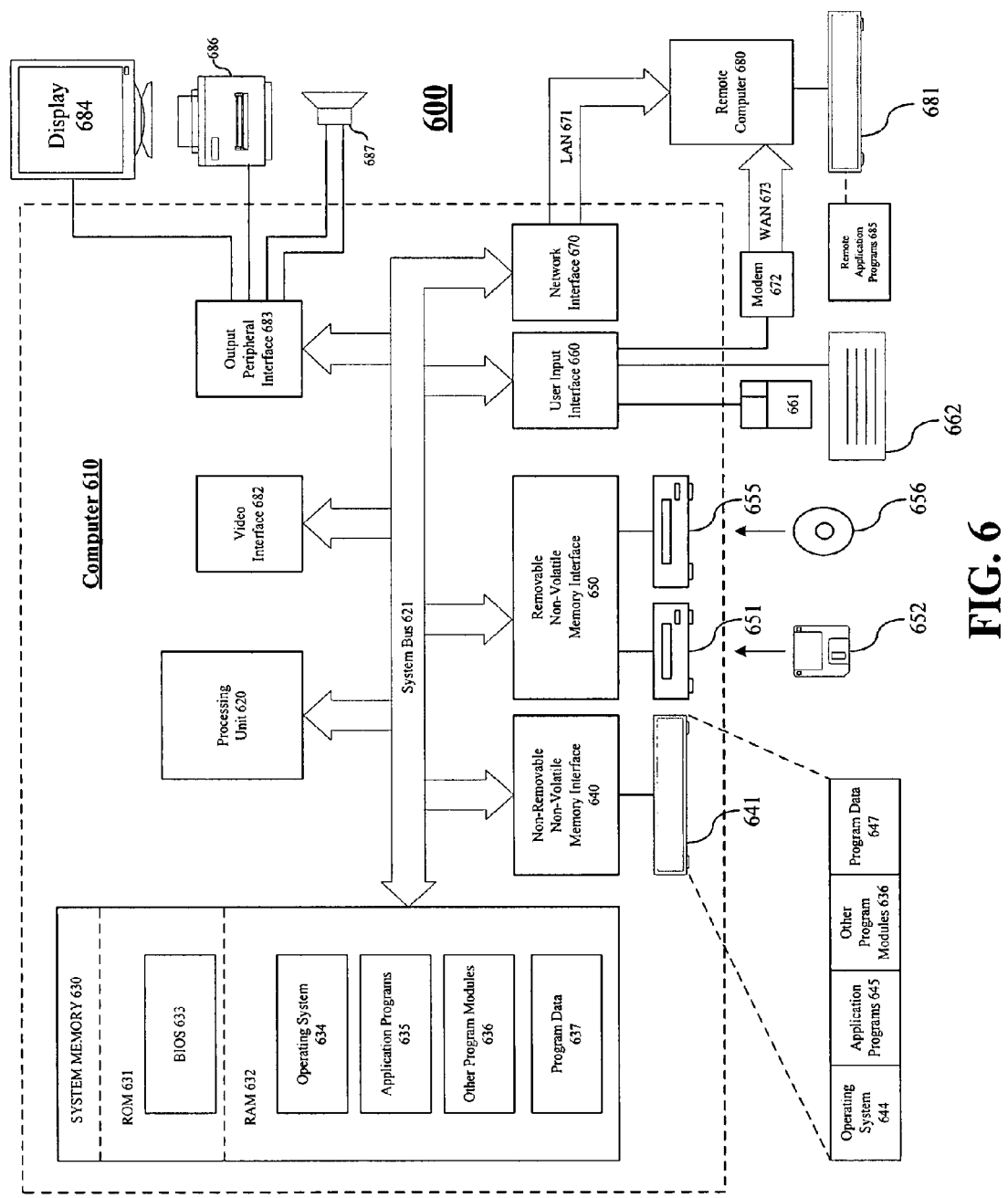
FIG. 6 illustrates one embodiment of a computing system architecture.

FIG. 6 illustrates a block diagram of a computing system architecture 600 suitable for implementing various embodiments, including the video conference system 100. It may be appreciated that the computing system architecture 600 is only one example of a suitable computing environment and is not intended to suggest any limitation as to the scope of use or functionality of the embodiments. Neither should the computing system architecture 600 be interpreted as having any dependency or requirement relating to any one or combination of components illustrated in the exemplary computing system architecture 600.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 6, the computing system architecture 600 includes a general purpose computing device such as a computer 610. The computer 610 may include various components typically found in a computer or processing system. Some illustrative components of computer 610 may include, but are not limited to, a processing unit 620 and a memory unit 630.

In one embodiment, for example, the computer 610 may include one or more processing units 620. A processing unit 620 may comprise any hardware element or software element arranged to process information or data. Some examples of the processing unit 620 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 620 may be implemented as a general purpose processor. Alternatively, the processing unit 620 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 610 may include one or more memory units 630 coupled to the processing unit 620. A memory unit 630 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 610. The embodiments are not limited in this context.

In one embodiment, for example, the computer 610 may include a system bus 621 that couples various system components including the memory unit 630 to the processing unit 620. A system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 610 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 600. Examples of computer readable media for computing system architecture 600 may include, but are not limited to, volatile and/or nonvolatile memory such as ROM 631 and RAM 632. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 630 includes computer storage media in the form of volatile and/or non-volatile memory such as ROM 631 and RAM 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636, and program data 637.

The computer 610 may also include other removable/non-removable, volatile/nonvolatile computer storage media. By way of example only, FIG. 6 illustrates a hard disk drive 640 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media discussed above and illustrated in FIG. 6, provide storage of computer readable instructions, data structures, program modules and other data for the computer 610. In FIG. 6, for example, hard disk drive 641 is illustrated as storing operating system 644, application programs 645, other program modules 646, and program data 647. Note that these components can either be the same as or different from operating system 634, application programs 635, other program modules 636, and program data 637. Operating system 644, application programs 645, other program modules 646, and program data 647 are given different numbers here to illustrate that, at a minimum, they are different copies. A user may enter commands and information into the computer 610 through input devices such as a keyboard 662 and pointing device 661, commonly referred to as a mouse, trackball or touch pad. Other input devices (not shown) may include a microphone, joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 684 or other type of display device is also connected to the system bus 621 via an interface, such as a video interface 682. In addition to the monitor 684, computers may also include other peripheral output devices such as speakers 687 and printer 686, which may be connected through an output peripheral interface 683.

The computer 610 may operate in a networked environment using logical connections to one or more remote computers, such as a remote computer 680. The remote computer 680 may be a personal computer (PC), a server, a router, a network PC, a peer device or other common network node, and typically includes many or all of the elements described above relative to the computer 610, although only a memory storage device 681 has been illustrated in FIG. 6 for clarity. The logical connections depicted in FIG. 6 include a local area network (LAN) 671 and a wide area network (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other technique suitable for establishing communications over the WAN 673, such as the Internet. The modem 672, which may be internal or external, may be connected to the system bus 621 via the user input interface 660, or other appropriate mechanism. In a networked environment, program modules depicted relative to the computer 610, or portions thereof, may be stored in the remote memory storage device. By way of example, and not limitation, FIG. 6 illustrates remote application programs 685 as residing on memory device 681. It will be appreciated that the network connections shown are exemplary and other techniques for establishing a communications link between the computers may be used. Further, the network connections may be implemented as wired or wireless connections. In the latter case, the computing system architecture 600 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the video conference system 100 and/or computing system architecture 600 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method comprising:
generating a temporal watermark signal that, when output by a display, is substantially undetectable by humans and detectable by an automated system using video analysis;
mixing the temporal watermark signal with a video signal; and
providing the mixed temporal watermark signal and video signal to a display, in use by a video conferencing system, for output.

2. The method of claim 1, wherein generating the temporal watermark signal comprises generating a low frequency pattern.

3. The method of claim 2, wherein the low frequency pattern is a periodic function direct current offset pattern.

4. The method of claim 1, wherein the temporal watermark signal, when output by the display, causes a periodic change in pixel values.

5. The method of claim 4, wherein the temporal watermark signal, when output by the display, causes a periodic change in a luminance value of pixels at a rate undetectable by humans.

6. An article comprising a storage medium containing instructions that when executed enable a system to:
generate a temporal watermark signal that, when output by a display, is substantially undetectable by humans and detectable by an automated system using video analysis;
mix the temporal watermark signal with a video signal; and
provide the mixed temporal watermark signal and video signal to a display, in use by a video conferencing system, for output.

7. The article of claim 6, wherein the instructions for generating the temporal watermark signal comprise instructions to generate a low frequency pattern.

8. The article of claim 7, wherein the low frequency pattern is a periodic function direct current offset pattern.

9. The article of claim 6, wherein the temporal watermark signal, when output by the display, causes a periodic change in pixel values.

10. The article of claim 6, wherein the temporal watermark signal, when output by the display, causes a periodic change in a luminance value of pixels at a rate undetectable by humans.

11. An apparatus comprising:
a processing unit; and
a temporal watermark generator executing on the processing unit to generate a temporal watermark signal that, when output by a display, is substantially undetectable by humans and detectable by an automated system using video analysis; and
a mixer to mix the temporal watermark signal with a video signal and provide the mixed temporal watermark signal and video signal to a display, in use by a video conferencing system, for output.

12. The apparatus of claim 11, the temporal watermark generator to generate a low frequency pattern.

13. The apparatus of claim 12, wherein the low frequency pattern is a periodic function direct current offset pattern.

14. The apparatus of claim 11, wherein the temporal watermark signal, when output by the display, causes a periodic change in pixel values.

15. The apparatus of claim 14, wherein the temporal watermark signal, when output by the display, causes a periodic change in a luminance value of pixels at a rate undetectable by humans.

* * * * *